United States Patent [19]

Jenne et al.

[11] 3,986,820
[45] Oct. 19, 1976

[54] METHOD AND APPARATUS FOR BURNING MULTIPHASE GYPSUM

[75] Inventors: Oswald Jenne; Josef Steinkuhl, both of Essen; Gerhard Reimann, Mulheim; Otto Wiechmann, Recklinghausen, all of Germany

[73] Assignee: Rheinstahl AG, Germany

[22] Filed: Feb. 18, 1975

[21] Appl. No.: 550,743

[30] Foreign Application Priority Data

Feb. 21, 1974 Germany............................ 2408313

[52] U.S. Cl.................................. 432/58; 432/172
[51] Int. Cl.² ........................................ F27B 15/00
[58] Field of Search ................. 432/14, 15, 58, 171, 432/172

[56] References Cited
UNITED STATES PATENTS

| | | | |
|---|---|---|---|
| 2,833,622 | 5/1958 | Roberts et al. ........................ | 432/58 |
| 3,203,681 | 8/1965 | Rosa et al. ............................ | 432/58 |
| 3,773,892 | 11/1973 | Reimann et al. ...................... | 432/15 |

Primary Examiner—John J. Camby
Attorney, Agent, or Firm—McGlew and Tuttle

[57] ABSTRACT

An apparatus for preparing multiphase gypsum and particularly wall plaster which has an exactly defined composition comprises a plurality of heating stages including at least one high temperature stage and at least two first and second separate low temperature stages. Heating gases are directed from a combustion chamber first to the high temperature stage and subsequently into each of the lower temperature stages. One of the low temperature stages is employed as a pre-burner and it is fed with materials from a common storage bin to pre-burn the material and then direct it to the high temperature stage. The other stage is provided with the heating gases from the high temperature stage and in addition it is controlled as to temperature, humidity and quantity of heating gases in its products together with the high temperature stage products after treatment are delivered to a common cooling device.

5 Claims, 1 Drawing Figure

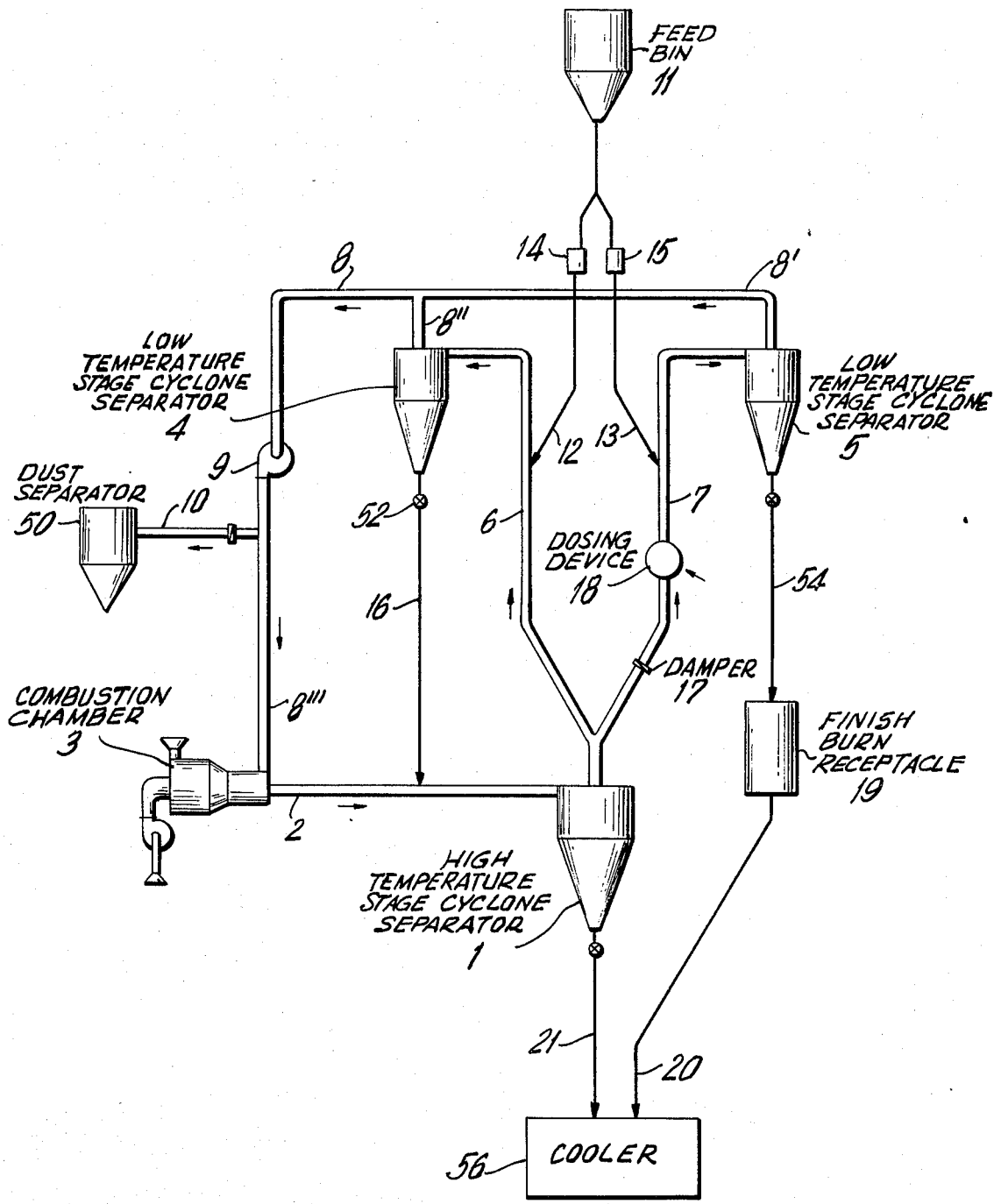

METHOD AND APPARATUS FOR BURNING MULTIPHASE GYPSUM

BACKGROUND OF THE INVENTION

1. Field of the Invention

This invention relates in general to an apparatus and method for preparing multiphase gypsum and particularly a wall plaster which has an exactly defined composition.

2. Description of the Prior Art

When multiphase gypsum is burned in a carrier gas installation particularly a cyclone type burning installation which has at least two stages the heating gas flows through the burning stages or cyclones consecutively but only a part of the raw material which has to be converted, for example into an anhydrite (high temperature burnt gypsum) passes through the stages consecutively while the part of the raw material to be converted into hemihydrate (low temperature burnt gypsum) is removed from the upper stage. Thereafter the high temperature burnt portion and the low temperature burnt portion are cooled in a common cooling equipment and mixed with each other.

Since the entire volume of heating gases flows through both the treatment stages and therefore in the upper stage or pre-burning stage all of the raw material is heated in the same manner, there is no possibility to further individually influence the low temperature burnt gypsum which is removed from the upper stage. This is disadvantageous because in the manufacture of multiphase gypsum such as wall plaster which has a quite definite composition of phases it would be desirable to control the calcination process so as to obtain a final product which is free from dihydrate and comprises only a minimum of the mostly undesirable anhydrite III phase.

SUMMARY OF THE INVENTION

The invention provides a multistage carrier gas burning installation particularly a cyclone-type burning installation for calcining multiphase gypsum. The invention relates in particular to the treatment of wall plaster having an exactly defined composition and it provides a device which will permit the separate manufacturing in a single plant of the two almost pure gypsum phases independently of each other.

In accordance with the invention in a carrier gas installation which includes at least one high temperature stage there are at least two low temperature burning devices or stages located above the high temperature stage which is supplied with the heating gas from a combustion chamber which is first circulated into the high temperature stage and then into each low temperature stage separately. The raw material is fed in separately to each of the stages in a controlled manner from a common feed bin. At least one of the low temperature stages is mounted in the feed direction so as to function as a pre-burning stage upstream of the high temperature stage or finish burning stage. At least one of the other burning devices of the lower stage is designed as an independent low temperature burning stage in which the heat and gas quantity, the heating gas temperature and the heating gas humidity are controlled. The final products of the high temperature stage and the controlled low temperature stage are directed into a common cooler.

In accordance with a development of the invention, the independent low temperature burning stage is provided with means for adding cooler heating gas, air and substances which increase the partial pressure of water vapor in the cyclone heater. Such a device advantageously comprises a single unit which is located at least two meters below the location where the material is fed in. This makes it possible to control the independent low temperature burning stage with regard to a definite final product and independently of the high temperature burning stage.

In accordance with a further development of the invention a device such as a finish-burn receptacle is provided between the outlet of the independent low temperature stage and the cooling equipment which permits the maintenance of the treated material at temperatures for a longer period of time. This equipment serves to convert the coarser pieces of material which are unavoidably formed, by finish burning them into hemihydrate. This makes it possible to manufacture a multiphase gypsum comprising a very pure hemihydrate phase and a very pure anhydrite II phase which is excellently suitable as wall plaster.

Accordingly it is an object of the invention to provide an improved apparatus for preparing multiphase gypsum which comprises a plurality of heating stages including at least one high temperature stage and at least two first and second separate low temperature stages which are heated by gases which are first passed through the high temperature stage and then through the low temperature stages and which are supplied with material separately in controlled amounts from a common feed bin and wherein one of the low temperature stages provides a pre-burner which receives material from the bin and directs it after pre-burning to the high temperature stage and the other operates individually and is separately controlled as to temperature, humidity and heating gas quantity.

A further object of the invention is to provide a method of preparing a multiphase gypsum using a plurality of separate cyclone separators forming heating stages which are fed from a common bin storage which comprises directing high temperature gases into a first high temperature cyclone separator while the gypsum material is fed from the bin storage thereto and directing the heating gases after they have given up some of their heat from high temperature cyclone to a first low temperature cyclone while the gypsum material is fed from the bin storage to the first low temperature cyclone to pre-burn the material, directing the pre-burned material from the first low temperature cyclone to said high temperature cyclone and separately feeding material to a second low temperature cyclone while directing heating gases from the high temperature cyclone thereto and controlling the gases so as to regulate them for humidity, quantity and temperature and separately discharging the treated materials from the high temperature cyclone and the low temperature cyclone to a cooler.

A further object of the invention is to provide an apparatus for preparing multiphase gypsum which is simple in design, rugged in construction and economical to manufacture.

For an understanding of the principles of the invention reference is made to the following description of a typical embodiment thereof as illustrated in the accompanying drawing.

BRIEF DESCRIPTION OF THE DRAWING

The only FIGURE of the drawing is a schematic representation of an apparatus for preparing multiphase gypsum constructed in accordance with the invention.

GENERAL DESCRIPTION OF THE PREFERRED EMBODIMENT

Referring to the drawings in particular the invention embodied therein comprises an apparatus for preparing multiphase gypsum particularly wall plaster which has an exactly defined composition. The apparatus includes a high temperature stage cyclone separator 1 which is supplied through a line 2 with high temperature gases from a gas generator such as a combustion device 3.

In accordance with the invention a plurality of separate low temperature stage cyclone separators are provided which includes at least one first low temperature cyclone 4 and at least one second low temperature cyclone 5. The low temperature cyclones 4 and 5 are heated by gases which have first been circulated through the high temperature stage 1 and give up some of their heat and then are delivered through separate lines 6 and 7 to the stages 4 and 5 respectively. Exhaust gases from the low temperature first and second cyclone separators 4 and 5 passes through lines 8" and 8' to a common line 8 where they are exhausted by a fan 9 through a line 10 to a dust separator 50. Some of the gases are also circulated through a conduit 8''' back to the combustion chamber 3.

A common feed bin or storage means 11 is located above all of the stages and is provided with the gypsum material which is preferably pre-dried. The material passes through separate lines 12 and 13 through controlling devices 14 and 15 which comprise cars into respective conduits 6 and 7 which connect the first low temperature stage cyclone 4 and the second low temperature stage cyclone 5 respectively.

In accordance with a feature of the invention the material which is directed into the first low temperature stage cyclone 4 is discharged through a connecting conduit 16 in controlled amounts regulated by a controller 52 through the inflow conduit 2 containing the heating gases so that the material is returned into the high temperature stage cyclone separator 1. This preburned material is then further treated in the high temperature stage cyclone separator along with the other material and it is finish burned for example to anhydrite II.

The material fed into the second cyclone 5 is finish burned to low temperature calcined gypsum for example hemihydrate which is as pure as possible. During this process cooler heating gas and/or air and/or agents for increasing the partial pressure of water vapor such as a water or moisture delivering substance is added in a controlled manner by means of an additional dosing device 18 which is mounted in the connecting line 7 provided for the flow of heating gases from the high temperature stage 1 to the low temperature stage separator 5. This line includes a damper 17 for the control of the rate of flow of the heating gases. The added agents serve to provide a formation of a high quality-modification of hemihydrate. The dosing device 8 is mounted at least 2 m below the connection of the feed line 13 into the line 7 in order to obtain a sufficient spacing for good mixing of the additives with the heating gases which come from the cyclone 1.

A low temperature calcined gypsum is delivered from the cyclone 5 to a conduit 54 into a finish burn receptacle 19 and it is permitted to have a long passage time therein. This makes it possible to achieve a post burning of the coarser pieces of material which might not be completely converted. Thereafter the low temperature burned gypsum passes through a line 20 into a cooling device 56. Similarly, the materials treated in the high temperature stage cyclone separator 1 is fed through a line 21 into the same coolant 56. There the two types of gypsum are mixed with each other and cooled.

While a specific embodiment of the invention has been shown and described in detail to illustrate the application of the principles of the invention, it will be understood that the invention may be embodied otherwise without departing from such principles.

What is claimed is:

1. An apparatus for preparing multiphase gypsum particularly wall plaster having an exactly defined composition, comprising a plurality of heating stages including at least one high temperature stage and at least two first and second separate low temperature stages, means for directing high temperature heating gases to said high temperature stage and subsequently directing the heating gases from said high temperature stage to said first and second low temperature stages respectively, means for separately controlling the heating gas quantity, temperature and humidity of at least said second low temperature stage, common feed bin means connected to each of said first and second low temperature stages and to said high temperature stage, means for regulating the feed from said feed bin means to each of said stages, said first low temperature stage comprising a pre-heater being connected to discharge pre-heated materials to said high temperature stage.

2. An apparatus according to claim 1, including a cooler, each of said high temperature stage and said second low temperature stage having a discharge to said cooler.

3. An apparatus according to claim 1, wherein there is a heating gas line connected to said high temperature stage and from said high temperature stage to each of said first and second low temperature stages, said feed bin means being connected directly into respective connections between said high temperature stage and respective first and second low temperature stages, said means for separately controlling the heating gas quantity temperature and humidity of said second low temperature stage including a device in the heating gas connection from said first high temperature stage cyclone separator to said first low temperature stage for adding substances for regulating the temperature and partial pressure of water vapor in the heating gas conduit, said device being located at least 2 meters below the location where said feed bin means connects into said heating gas connection.

4. An apparatus according to claim 1, including a cooler, each of said high stage cyclone separator and said second low temperature stage cyclone separators being connected to discharge material to said cooler, means in the discharge connection between said second low temperature stage separator and said cooler for finish burning the material.

5. An apparatus for preparing multiphase gypsum particularly wall plaster having an exactly defined composition, comprising a plurality of heating stages including at least one high temperature stage and at least two first and second separate low temperature stages, means for directing high temperature heating gases to said high temperature stage and subsequently directing the heating gases from said high temperature stage to said first and second low temperature stages respectively, means for separately controlling the heating gas quantity, temperature and humidity of at least said second low temperature stage, common feed bin means connected to each of said first and second low temperature stages and to said high temperature stage, means for regulating the feed from said feed bin means to each of said stages, said first low temperature stage comprising a pre-heater being connected to discharge pre-heated materials to said high temperature stage, the finished burn receptacle, said second low temperature stage being connected to discharge its material to said finish burn receptacle, said finish burn receptacle being provided for maintaining the materials at increased temperature for a long period of time.

* * * * *